Oct. 6, 1959    J. T. FISHER    2,907,927
METER BOX
Filed March 18, 1954    2 Sheets-Sheet 1

INVENTOR.
JAMES T. FISHER
BY
ATTORNEY

Oct. 6, 1959    J. T. FISHER    2,907,927
METER BOX
Filed March 18, 1954    2 Sheets-Sheet 2
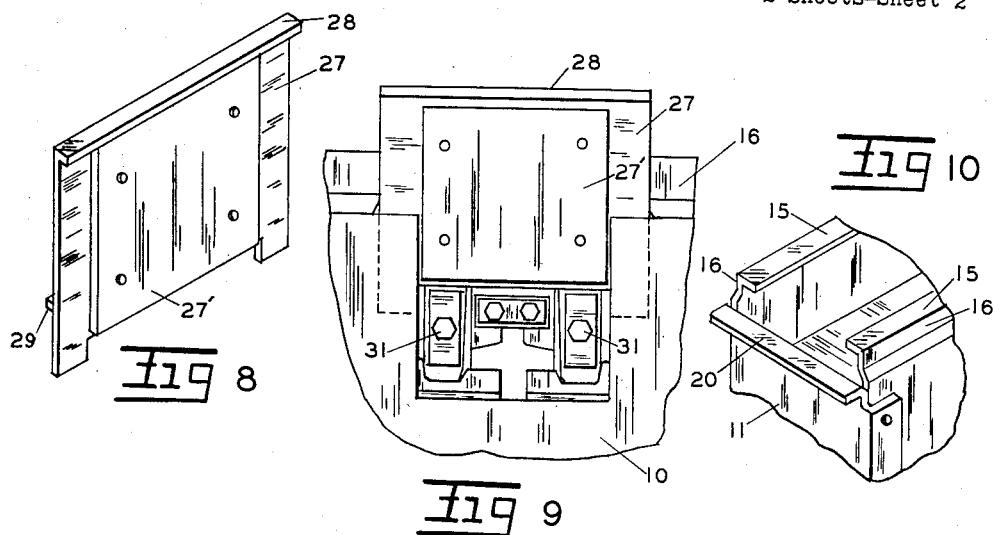
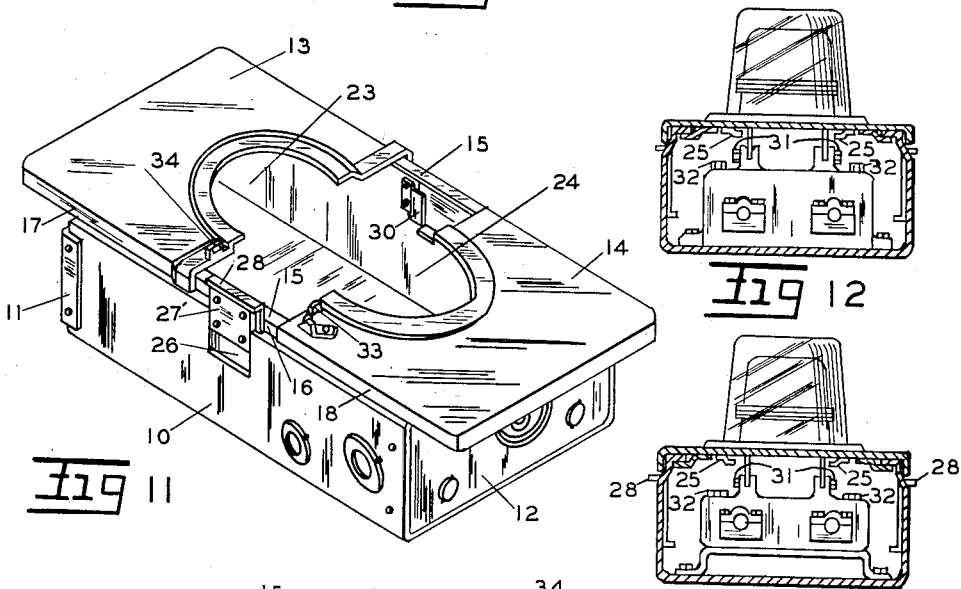
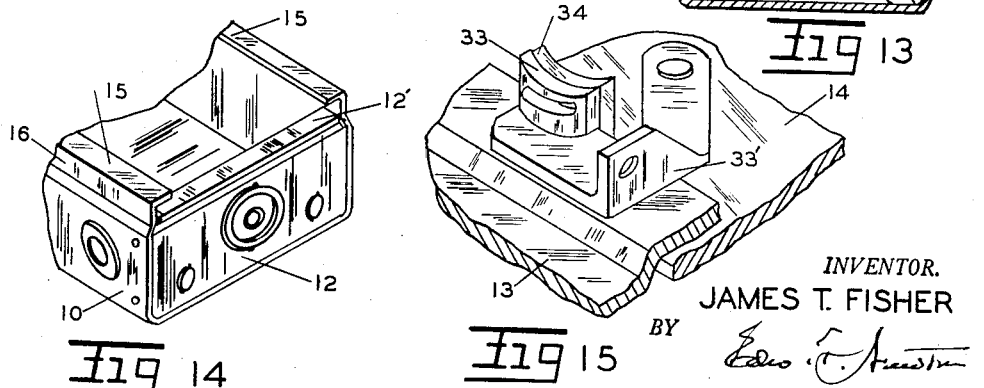
INVENTOR.
JAMES T. FISHER
BY
ATTORNEY

United States Patent Office 2,907,927
Patented Oct. 6, 1959

2,907,927
METER BOX

James T. Fisher, Atlanta, Ga., assignor to B. & C. Metal Stamping Company, Atlanta, Ga., a corporation of Georgia Application March 18, 1954, Serial No. 417,176

5 Claims. (Cl. 317—109)

This invention relates to a meter box and more particularly to a box for receiving a socket type electric meter.

It is desirable that the meter, with its glass cover, project beyond the front cover of the box. The meters and their glass covers are conventionally either cylindrical or substantially elliptical in shape. The meter assembly previously has protruded through a hole in a demountable cover on the meter box. In placing the meter in position on the conventional box the cover is removed, the meter "plugged in" to the connector blocks mounted in the box, and the cover is replaced. Access to the connector blocks, in the previous meter boxes can only be had by removal of the cover and the meter.

An object of my invention is to provide a meter box in which access to the connector blocks can be had without removing the meter from the circuit.

A further object of my invention is to provide a meter box with sliding covers that slide apart to permit ready mounting and removal of the meter and which, when in open position, permit uncovering of auxiliary openings which give access to the connector blocks for inspection and adjustment.

A further object of my invention is to provide a meter box that is weather-tight and which may be used with different models of connector blocks and meters without requiring any modifications to the box.

Other and further objects and advantages of my invention will be apparent from the following description taken in connection with the accompanying drawing in which like characters of reference designate corresponding parts throughout the several views, and in which:

Fig. 8 is a perspective view of a closure for the auxiliary openings.

Fig. 9 is a fragmentary elevation of a side of the box showing the auxiliary opening and the closure therefor in partially open position.

Fig. 10 is a fragmentary perspective view showing the top of the box with the upper sliding cover removed.

Fig. 11 is a perspective view showing the box with the covers slid back into open position and one auxiliary closure partially open.

Figs. 12 and 13 are cross-sections of the box showing different models of connector blocks mounted therein.

Fig. 14 is a fragmentary perspective view looking at the bottom of the box with the lower sliding cover removed.

Fig. 15 is a detail perspective view showing the hook and hasp to secure the box in closed condition.

Figure 1:
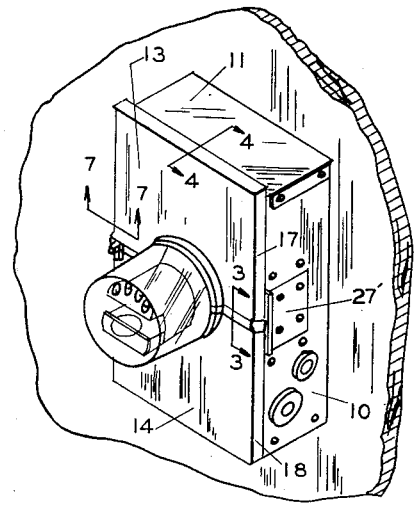
Fig. 1 is a perspective view showing the meter box of my invention in use.

In the embodiment of my invention chosen for purpose of illustration, the body 10 of the meter box is formed of a sheet of metal folded into generally U-shape to form the back and side walls of the box. An end wall 11 overlapping the outside of body 10 is provided at the top end of the box and an end wall 12 with flanges secured to the inner wall of body 10 is provided at the lower end of the box. (Figs. 1 and 11.)

Front covers 13 and 14 slide on inwardly extending flanges 15 (see Fig. 11) which are bent from inwardly offset portions 16 at the front edges of box body 10.

Figure 4:
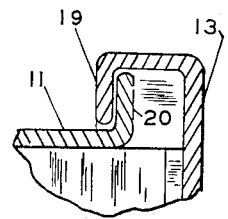
Fig. 4 is a fragmentary section taken on line 4—4 of Fig. 1.

The cover 13 closing the top portion of the box is provided with a reverse bend 19 at its top edge, as seen in Fig. 4, to enclose an upstanding flange 20 formed at the front edge of end wall 11. This structure insures that rain water will not enter the box from above.

Figure 2:
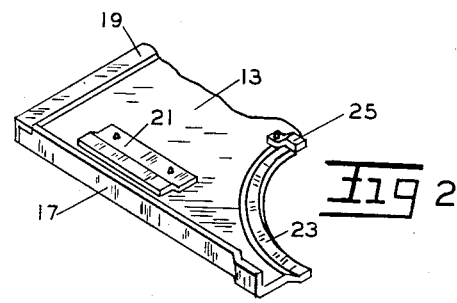
Fig. 2 is a fragmentary perspective view of the upper cover of the device shown in Fig. 1.
Figure 7:
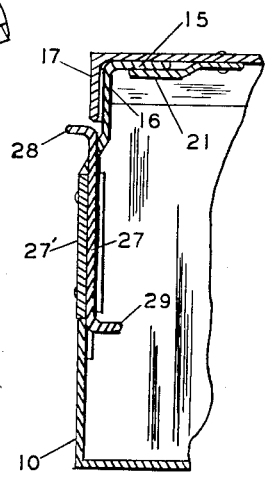
Fig. 7 is a fragmentary sectional view of the box taken along line 7—7 of Fig. 1.

The side edges of cover 13 are flanged rearwardly at 17 to fit slidingly over offset portions 16 of the box body. Clips 21 are mounted on the inner side of cover 13 to form channels to slidingly receive flanges 15, as seen in Figs. 2, 7 and 11.

Figure 3:
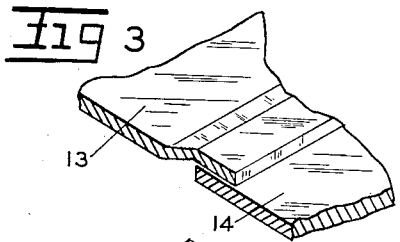
Fig. 3 is a fragmentary perspective and sectional view taken on line 3—3 of Fig. 1.

The lower edge of cover 13 has a cut-out portion 23 to form half the opening in the front of the box and formed with an outwardly flaring flange. This cut-out portion engages about the upper half of the flange on the glass cover of an electric meter of standard design, as seen in Figs. 1 and 11, or may be shaped to fit non-standard meters. The remainder of the lower edge of cover 13 is formed with an outwardly offset flange to extend over the upper edge of the cover 14. This arrangement is illustrated in Fig. 3.

Cover 14 is formed with a cut-out portion 24 in its upper edge to form the other half of the opening in the front of the box. The cut-out portion is formed with an outwardly flaring flange to match the flange on cover 13, as shown in Figs. 1 and 11. The side edges of cover 14 are formed with flanges 18 corresponding to flanges 17 of cover 13.

Adjacent the openings 23, 24, clips 25 are arranged on the inner side of the covers 13 and 14 to engage the inner side of the flange on the meter, as shown in Figs. 12 and 13, or to engage a blank of the size and shape of the meter flange in case the meter is removed for an extended time.

The bottom end wall 12 of the box is formed with an upturned flange 12' at the front edge. This flange prevents rain water entering the box at the bottom of the box.

A hub connection may be provided at the top of the box and knockout openings are provided on the lower sides and in the bottom of the box in a manner known in the art.

Figures 5, 6:
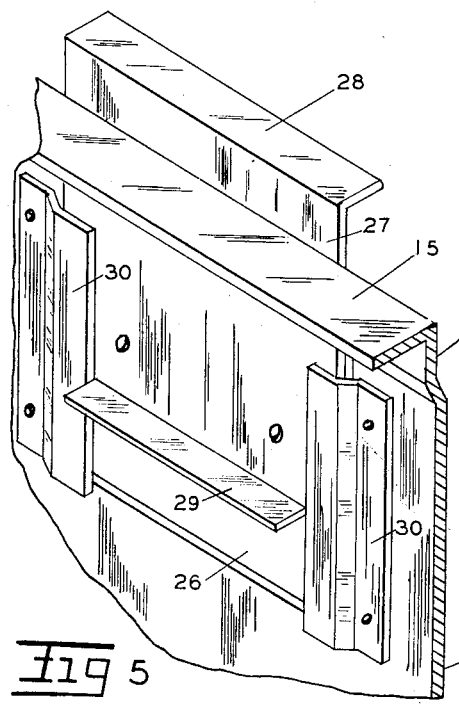
Fig. 5 is a fragmentary perspective view from the direction of the arrow in Fig. 11.
Fig. 6 is a fragmentary perspective of the auxiliary opening showing the closure slide with the auxiliary closure removed. This view is from the outside of the box in the direction opposite the direction of Fig. 5.

Opposite the point of juncture of covers 13 and 14, the side walls of box body 10 are provided with auxiliary openings 26, as seen in Figs. 5, 9 and 11, and as seen in section in Fig. 7. Auxiliary openings 26 are generally rectangular but are provided at the top, where flange 16 is offset, with lateral extensions 26'. Clips 30 are provided along the upper and lower edges of opening 26 to form closure guiding channels at right angles to the direction of motion of closures 13 and 14. A closure element 27 slides in the channels and extends outwardly through the lateral extensions 26' of opening 26. In normal closed position, a flange 28 at the outer edge of closure 27 extends at right angles and away from offset flange 16. When covers 13 and 14 are in closed position, their flanges 17 and 18 overlie flanges 28 of closure 27 so that the auxiliary openings may not be opened without first opening the covers 13 and 14.

At the inner edge of closure 27, a flange 29 is provided extending inwardly of the box at right angles and provides a stop against complete removal of closure 27 from the box.

A plate 27' of the same material is secured to the outer face of closure 27 so the surface of plate 27' is flush with the outer surface of box body 10.

Referring to Figs. 12 and 13, it will be seen that connector blocks of different designs may be accommodated in the meter box of my invention. As will be seen in these figures, bolt heads 31 and 32 can be reached with a tool through the auxiliary openings 26 without removal of the meter from the connector blocks.

Fig. 15 shows a hook 33 pivoted to cover 14 which, when covers 13 and 14 slide into closed position, is adapted to cammingly engage upstanding hasp element 34 formed on the bottom edge of cover 13. Hook 33 and hasp 34 are formed with complementary openings to receive a sealing pin which may be wired to an upstanding thumb piece 33' formed on hook 33.

In use, the meter box, as seen in Figs. 1 and 11, is mounted on a vertical support, and with the covers 13 and 14 in open position the connector block is mounted therein by bolts threaded into the body 10 of the box, or into a reinforcing bar mounted on the box in a conventional manner. Electric leads are introduced into the box by use of the most convenient of the conventional knock-out openings formed at the lower end of the box, and the desired connections are made to the connector block. With the covers 13 and 14 still in open position, the meter is "plugged" in and any required adjustments are made through auxiliary openings 26. Upon completion of the adjustments, the auxiliary openings are closed, covers 13 and 14 are slid into closing position and secured by means of hook 33 engaging hasp 34.

Subsequent adjustments to the connector blocks may be made by sliding open covers 13 and 14 and opening closures 27. The adjustments can therefore be made without interrupting service through the meter box.

It will be apparent that if the meter is removed and it is desired to leave the connector block in place, a blank (for instance of glass) of the same configuration as the opening formed by cutaway portions 23, 24 may be provided to close the opening. This blank will be held in position by clips 25 and the flange abut cutaway portions 23, 24.

It will be obvious to those skilled in the art that many modifications and changes can be made without departing from the scope of my invention as defined in the appended claims.

I claim:

1. In a meter box comprising in combination a back wall, side walls, a bottom and a top wall; connector blocks carried by said back wall; jaws mounted on said blocks; a socket type electric meter having contact blades removably received by said jaws; a peripheral flange on said meter; said side walls being constructed of such a depth that said peripheral flange lies in substantially the plane of the outer edge of said walls when said meter is in position; flanges extending inwardly from said side walls; a cover for the upper portion of said box slidingly gripping said side wall flanges, the lower edge of said cover being of such configuration as to engage substantially half of said peripheral flange of said meter, a cover for the lower portion of said box slidingly gripping said side wall flanges, the upper edge of said cover being of such configuration as to engage substantially half of said peripheral flange of said meter to complete the peripheral engagement between said peripheral flange and said covers; auxiliary openings in said side walls so positioned as to bridge the juncture between the covers when engaging the peripheral flange of the meter and to afford access to the connector blocks for inspection and adjustment without removal of the meter; closures for said auxiliary openings, said closures being so constructed and arranged that opening thereof is prevented by both of said covers when said covers are in normal closing position.

2. In a meter box comprising in combination a back wall, side walls, a top and a bottom wall; a meter sealed within a housing mounted in said box; a two-part cover for said box, the upper part of said cover slidingly engaging the upper portion of said meter box and conformed to encircle substantially half of a meter housing, the lower part of said cover slidingly engaging the lower portion of said meter box and conformed to encircle the remainder of the meter housing and to engage the bottom edge of said upper part of said cover; openings in said side walls adjacent the points of engagement of the two parts of said cover; closures for said openings, said closures being operative, only upon sliding both of said covers out of engagement with said meter housing, to give access to the rear of said meter through said side wall openings.

3. A meter box to enclose electrical connectors comprising a rear wall, side walls, a top and a bottom wall, openings in said side walls substantially mid-length thereof, closures for said openings movable to uncover said openings, two cooperating sliding covers for said box which when in normal closed position both overlie the closures for said openings to prevent opening thereof, said covers each having a recess so that in normally closed position said covers define therebetween an aperture for a meter housing, and flanges at the outer edges of said side walls, said covers being slideably mounted on said flanges.

4. The device of claim 3 in which the closures for said openings are slideable in channels provided within said box.

5. The device of claim 3 in which the closures for the openings in the side walls extend outwardly through an opening in an offset in the side walls, said closures being provided with a flange at the outer edge thereof at said offset to form a handle for manipulation of said closure.

References Cited in the file of this patent

UNITED STATES PATENTS

| | | |
|---|---|---|
| D. 124,622 | Hilton | Jan. 14, 1941 |
| 685,765 | Jacobs | Nov. 5, 1901 |
| 1,243,246 | Bonnell | Oct. 16, 1917 |
| 1,271,216 | Platt | July 2, 1918 |
| 1,396,434 | Horton | Nov. 8, 1921 |
| 1,628,889 | Krantz | May 17, 1927 |
| 2,040,003 | Jorgensen | May 5, 1936 |
| 2,548,540 | Lewis | Apr. 10, 1951 |
| 2,582,638 | Lewis | Jan. 15, 1952 |
| 2,620,377 | Lajeunesse | Dec. 2, 1952 |
| 2,626,309 | Road | Jan. 20, 1953 |
| 2,640,619 | Schneiderman | June 2, 1953 |
| 2,691,693 | Lewis | Oct. 12, 1954 |